(12) United States Patent
Holliger (10) Patent No.: US 7,815,177 B2
(45) Date of Patent: Oct. 19, 2010

(54) APPARATUS FOR ALIGNING AND/OR RETAINING PALLET TO BE REPAIRED AND/OR PALLET ELEMENTS

(75) Inventor: Robert Holliger, Boniswil (CH)

(73) Assignee: Holliger Paletten Logistik AG, Boniswil (CH)

( * ) Notice: Subject to any disclaimer, the term of this patent is extended or adjusted under 35 U.S.C. 154(b) by 0 days.

(21) Appl. No.: 11/559,168

(22) Filed: Nov. 13, 2006

(65) Prior Publication Data

US 2007/0108682 A1 May 17, 2007

(30) Foreign Application Priority Data

Nov. 14, 2005 (CH) .................................. 1818/05

(51) Int. Cl.
*B25B 1/20* (2006.01)
(52) U.S. Cl. .................. 269/37; 269/303; 269/315; 29/281.1
(58) Field of Classification Search .................. 269/37, 269/32, 20, 99–101, 303, 900, 319, 315; 29/281.1, 281.3
See application file for complete search history.

(56) References Cited

U.S. PATENT DOCUMENTS

| | | | | |
|---|---|---|---|---|
| 3,880,416 A | * | 4/1975 | Horwitz | 269/152 |
| 4,170,345 A | * | 10/1979 | Townsend | 269/88 |
| 4,647,027 A | * | 3/1987 | Shafto | 269/100 |
| 5,060,920 A | * | 10/1991 | Engibarov | 269/282 |
| 5,174,004 A | * | 12/1992 | King et al. | 29/251 |
| 5,947,460 A | * | 9/1999 | Williams | 269/37 |
| 6,394,438 B1 | * | 5/2002 | Glaser | 269/43 |
| 2007/0108682 A1 | * | 5/2007 | Holliger | 269/37 |

FOREIGN PATENT DOCUMENTS

EP 0031759 * 12/1980

* cited by examiner

*Primary Examiner*—Lee D Wilson
(74) *Attorney, Agent, or Firm*—Maginot, Moore & Beck LLP (57) ABSTRACT

An apparatus is disclosed for aligning and/or retaining pallets to be repaired and/or pallet elements used in repairing pallets. The apparatus comprises a base frame comprising at least one fixed lateral stop member and at least one movable lateral stop member for each bottom deck board member and/or for each connecting block member of a pallet. The movable lateral stop member is adapted to press the particular bottom deck board member and/or the assigned connecting block members against the cooperating fixed lateral stop member, such that the particular bottom deck board member and/or the connecting block members is/are aligned with reference to a line running perpendicular to the longitudinal axis of the pallet and retained in that position. Preferably, a movable lateral stop member is assigned to each fixed lateral stop member. Additionally, the apparatus comprises at least one fixed longitudinal stop member and at least one movable longitudinal stop member.

21 Claims, 5 Drawing Sheets

APPARATUS FOR ALIGNING AND/OR RETAINING PALLET TO BE REPAIRED AND/OR PALLET ELEMENTS

BACKGROUND

The present invention refers to an apparatus for aligning and/or retaining pallets to be repaired and/or pallet elements, whereby the pallets comprise a plurality of top deck board members, stringer board members and bottom deck board members, whereby a bottom deck board member is attached to the stringer board members by means of connecting block members, and whereby the pallet elements are attached to each other by connector means, particularly by nails.

The German Patent Publication DE-A-43 08 580 discloses a method and an apparatus for repairing damaged pallets. The damaged pallet is positioned and fixed on a machine table with its top side facing downwards. Thereafter, the damaged connecting blocks and board members are cut out with a separating device that is movable in three coordinate axes. The separating device comprises a machine head provided with a vertically running drive shaft. At the end of the drive shaft, a rotating circular saw blade is attached. The diameter of the circular saw blade is chosen such that it is smaller than the distance between the rows of connecting block members extending in longitudinal direction. Thus, the circular saw blade can be moved into the space between two adjacent rows of connecting block members extending in longitudinal direction, with the result that the damaged elements of the pallet can be selectively sawn off. Upon separating the damaged elements, the connector means, —nails—, are cut through. After the damaged elements having been removed, the pallet is transferred to a supply and assembly station where the elements to be replaced are fed to the corresponding location and positioned. The real attachment of the new parts is performed by means of two nailing devices, simultaneously driving in nails from the top and from the bottom.

The German Patent Publication DE-A-198 22 229 also discloses a method and an apparatus for repairing damaged wooden pallets. According to this publication, in a first step, the damaged board members and/or skids are separated from the pallet to be repaired. In a second step, the new parts are aligned to the pallet and thereafter nailed thereto. In a further step, the pallets are pressed, such that nails not fully driven in and board members not fully seated are brought into proper position. The apparatus for performing these method steps comprises a feed conveyor for feeding in the pallets, a destacker for singularizing the pallets, a disassembly station for selectively separating damaged parts, an assembly station for replacing the damaged parts, a centering and nailing station for attaching the replaced parts as well as a pressing station for pressing in protruding nails and not fully seated board members. The centering and nailing station serves, amongst else, for exactly positioning the replacement skids and the replacement top deck board members. To this end, the centering and nailing station is provided with three centering channels adapted to receive the three skids of a pallet. The right side centering channel is provided with a fixed outer wall and with a wall movable under the influence of spring biased push members, while the central centering channel is provided with two movable side walls that are pressed inwards under the influence of spring biased push members. The spring forces of the two push members acting on the two side walls are dimensioned such that the central skid is positioned with regard to the fixed right side outer wall. Finally, the left side centering channel comprises a movable inner wall and a movable outer wall, both under the influence of a spring biased push member, whereby the outer wall is higher than the inner wall. Thereby, the objective should be realized that the entire pallet, including its left side skid, is pressed against the fixed side wall and, thereby, positioned.

It is the object of the present invention to improve an apparatus for aligning and/or retaining pallets to be repaired and/or pallet elements of the kind mentioned herein before in such a way that the pallet elements to be attached to a partially disassembled pallet and the possibly displaced and/or rotated pallet elements, particularly bottom deck board members and/or connecting block elements, are aligned in proper position and retained therein such that they can be attached in their desired nominal position by applying new connector members.

To meet these and other objects, the invention provides an apparatus for aligning and/or retaining pallets to be repaired and/or pallet elements, whereby the pallets comprise a plurality of top deck board members, stringer board members and bottom deck board members, whereby a bottom deck board member is attached to the stringer board members by means of connecting block members, and whereby the pallet elements are attached to each other by connector means, particularly by nails. According to the invention, the apparatus comprises at least one fixed lateral stop member and one movable lateral stop member for each bottom deck board member and/or for each connecting block member, whereby each of the movable lateral stop members is adapted to press the assigned bottom deck board member and/or the assigned connecting block member against the related fixed lateral stop member in such a way that the particular bottom deck board member and the particular connecting block member, respectively, is positioned at least with regard to a line extending perpendicular to the longitudinal axis of the pallet and retained in this position.

A further object of the invention is that the apparatus shall ensure that the exterior dimensions of the pallet are within predetermined limits. This object is met with an apparatus which further comprises at least one fixed longitudinal stop member and at least one movable longitudinal stop member, said at least each one fixed and movable stop members extending perpendicularly to said lateral stop members and adapted particularly to define the dimensional accuracy in longitudinal direction, and/or to align the top deck board members and/or the bottom deck board members with regard to the longitudinal axis of the pallet as well as to retain them in that position.

DESCRIPTION OF THE FIGURES

Preferred embodiments and further developments of the apparatus of the invention are described in the dependent claims 2, 3 and 5 to 11.

In the following, a preferred embodiment of the apparatus according to the invention will be further described, with reference to the accompanying drawings, in which.

DESCRIPTION OF THE ILLUSTRATED EMBODIMENTS

Figure 1:
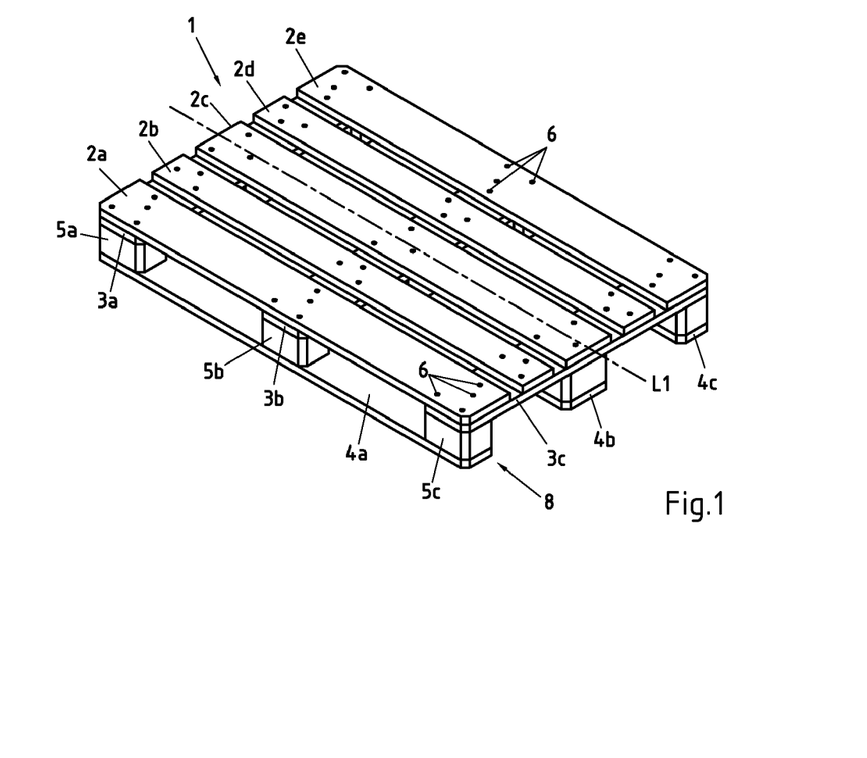
FIG. 1 shows a perspective view of a pallet.

FIG. 1 shows a pallet 1 in a perspective view. The Europallet 1 shown in the drawing is made exclusively of wooden components and comprises five top deck board members 2a-2e, running in longitudinal direction, three stringer board members 3a-3c running crosswise to and below the top deck board members 2a-2e, as well as three bottom deck board members 4a-4e running in longitudinal direction. Each of the three bottom deck board members 4a-4c is fixed to the three stringer board members 3a-3c by means of three block members 5a-5c. Regarding the five top deck board members 2a-2e, the two inner top deck board members 2b, 2d are narrower than the two outer top deck board members 2a, 2e and the central top deck board member 2c. The individual elements of the pallet are fixed to each other by means of connectors, preferably in the form of nails 6, whereby nails 6 are driven in both from the top side and from the bottom side of the pallet 1. The nails 6 driven into the pallet 1 from the top side thereof attach the particular top deck board member 2a-2e to the particular stringer board member 3a-3e located there below as well as to the assigned block member 5, while the nails 6 driven into the pallet 1 from the bottom side thereof attach the particular bottom deck board member 4a-4c to the assigned block member 5. In other words, a nail 6 driven into the pallet 1 from the top thereof penetrates both a top deck board member as well as a stringer board member and is seated in the block member 5, while a nail 6 driven into the pallet 1 from the bottom thereof penetrates a bottom deck board member and is seated in the connecting block member 5 as well. It is understood that the nails 6 driven into the pallet from the bottom thereof are not visible in FIG. 1. The longitudinal axis of the pallet is designated with reference numeral L1.

Figure 2:
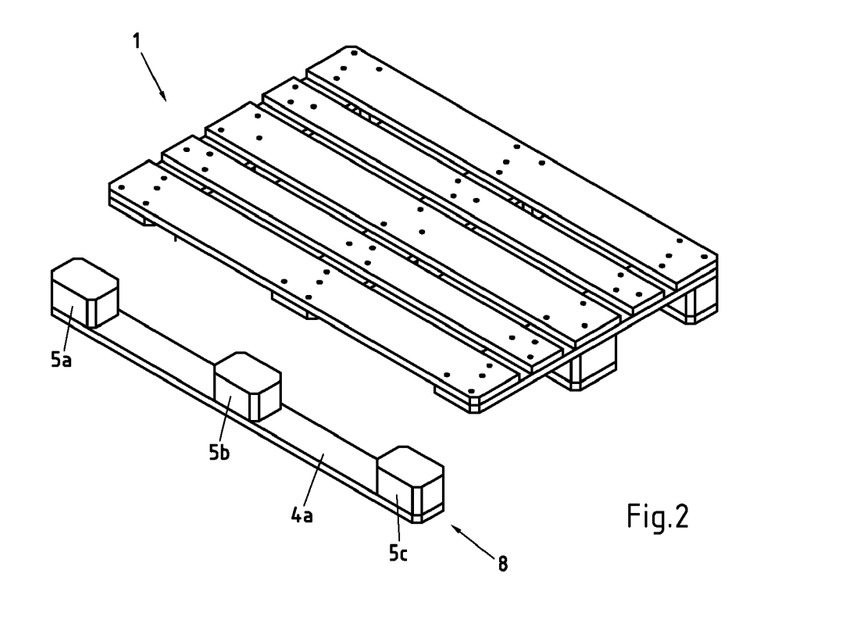
FIG. 2 shows a perspective view of a partially disassembled pallet and a new skid.

FIG. 2 shows a pallet 1 in a partially disassembled state. Particularly, a skid is missing that has been removed in a preceding step, for example by cutting through the nails below the three stringer board members 3a, 3b, and 3c. A new skid element 8, adapted to replace the removed skid, is separately shown in FIG. 2.

Figure 3:
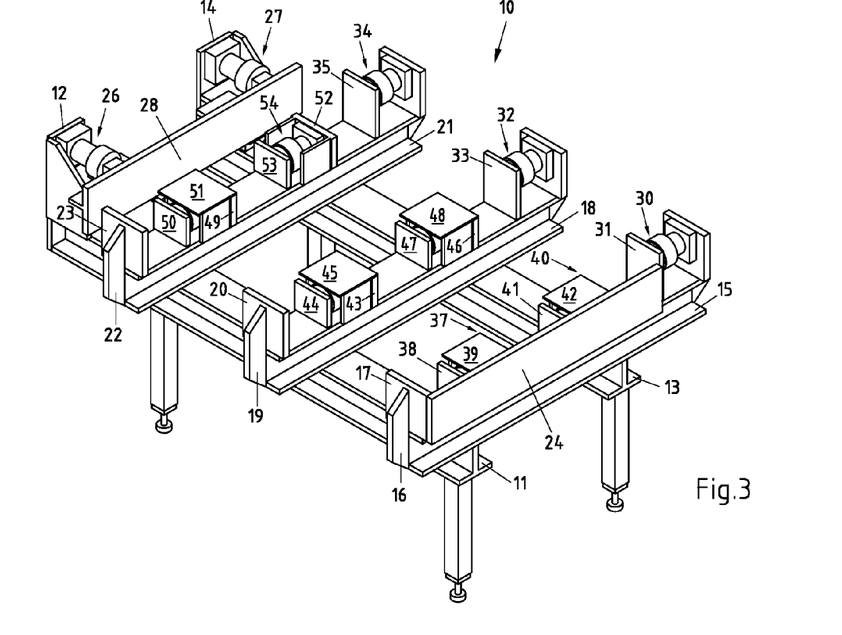
FIG. 3 shows a perspective view of the apparatus for aligning and retaining a pallet to be repaired and pallet elements.

FIG. 3 shows a perspective view of the apparatus 10 serving for aligning and retaining a pallet and pallet elements. The apparatus shown in the present drawings is particularly suitable for aligning and retaining wooden EURO pallets as well as elements thereof. On the one hand, the apparatus is adapted to align a pallet to be repaired as well as the replacement elements to be attached thereto in a well defined position and to retain the pallet and the elements in this position, such that the new pallet elements can be attached to the pallet by means of connectors, particularly nails, or such that additional connectors can be applied to the pallet for stabilizing the latter one. On the other hand, the apparatus can be used to positionally align individual pallet elements, particularly bottom deck board members and/or connecting block members, and to retain these elements in such a way that they can be attached to the pallet in the correct location by applying new connectors. The latter one can be particularly advantageous in the case of repairing loose or wobbly pallets.

The apparatus shown in FIG. 3 is in its initial position, ready to receive a pallet. It comprises a base frame member, having four feet members, two longitudinal support members 11, 13 as well as three transverse support members 15, 18, 21. Each of the transverse support members 15, 18, 21 is of substantially L-shaped design, each having a base portion 16, 19, 22 extending in vertical direction and forming a fixed lateral stop member 17, 20, 23 onto which the longitudinal side of a pallet abuts. The real lateral stop member is constituted by a rectangular plate member. The top sides of the transverse support members 15, 18, 21 constitute the rest surfaces for the bottom deck board members of a pallet, as will be further explained herein below. The front most transverse support member 15 is provided with a front face stop member 24 in the form of a fixedly attached strip member, running perpendicular to the previously mentioned lateral stop members 17, 20, 23. This front face stop member 24 constitutes a fixed stop for the front face of the pallet. Moreover, the front most lateral stop member 17 constitutes, together with the above mentioned front face stop member 24, a fixed reference point for the pallet to be received in the apparatus.

The two longitudinal support members 11, 13 are of generally L-shaped design as well, each having a base portion 12, 14 running perpendicular to the longitudinal portion of the support members 11, 13 and each provided with a hydraulic cylinder 26, 27. Attached to these hydraulic cylinders 26, 27 is a movable rear face stop member 28 in the form of a strip member by means of which the pallet can be pushed in a direction towards the fixed front face stop member 24.

At the end opposite to the fixed lateral stop member 17, 20, 23 of each transverse support member 15, 18, 21, a movable lateral stop member 31, 33, 35 is provided, constituted in the present case by a rectangular plate member and operated in each case by a hydraulic cylinder 30, 32, 34. Thus, the above mentioned three fixed lateral stop members 17, 20, 23, together with the three movable lateral stop members 31, 33, 35 and with the fixed as well as with the movable front and rear stop members, define a rectangular recess for receiving a pallet.

Besides the three already mentioned, fixed lateral stop members 17, 20, 23 located at the ends of the particular transverse support members 15, 18, 21, the apparatus further comprises six more fixed lateral stop members 37, 40, 43, 46, 49, 52. Thus, in total, nine fixed lateral stop members 17, 20, 23, 37, 40, 43, 46, 49, 52 are provided, whose positions are matched to the positions of the nine connecting block members of a pallet. Assigned to each of these nine fixed lateral stop members 17, 20, 23, 37, 40, 43, 46, 49, 52 is a movable lateral stop member 31, 33, 35, 38, 41, 44, 47, 50, 53, each being operated by a hydraulic cylinder. By providing such paired assemblies of fixed and movable lateral stop members, it is ensured that both the three bottom deck board members as well as also the nine connecting block elements of a pallet are aligned parallel to each other and retained in this position. Furthermore, since each bottom deck board member as well as the three connecting block members assigned thereto are pressed against a fixed lateral stop member 17, 20, 23, 37, 40, 43, 46, 49, 52, the three bottom deck board members and the nine connecting block members are not only aligned parallel to each other, but their position with regard to a line running transversely to the longitudinal central axis of the pallet is also set absolutely. Thus, the apparatus of the invention is suitable, on the one hand, for repairing loose and wobbly pallets in which the position of the bottom deck board members as well as of the connecting block members has to be checked and set, respectively, or corrected. On the other hand, the apparatus of the invention is also suitable particularly for positionally accurately attach bottom deck board members and/or connecting block members and/or skid elements, since these parts and elements are both positioned with regard to the central longitudinal axis and clamped by the nine movable lateral stop members. It is understood that the apparatus may be used also for attaching top deck board members and/or stringer board members.

Above the six hydraulic cylinders for moving the movable lateral stop members 38, 41, 44, 47, 50, 53 located within the recess, in each case a support plate member 39, 42, 45, 48, 51 is provided on which the stringer board members of the pallet rest. In the case of the rearmost lateral stop member 53, as seen in FIG. 3 of the drawing, the support plate member is not shown; thus, the hydraulic cylinder 54 serving for moving the lateral stop member 53 is visible. It is understood, however that this stop member 53 is also provided with a support plate member in practice; it only has been omitted in the drawing for clarity's sake. Each of the hydraulic cylinders 54 should be adapted to exert a force of at least 5 kN, particularly at least 15 kN, in a direction towards the assigned fixed stop member, in order to ensure that possibly displaced and/or disoriented pallet elements, particularly connecting block members and/or bottom deck board members, are pushed back into their predetermined positions.

Figure 4:
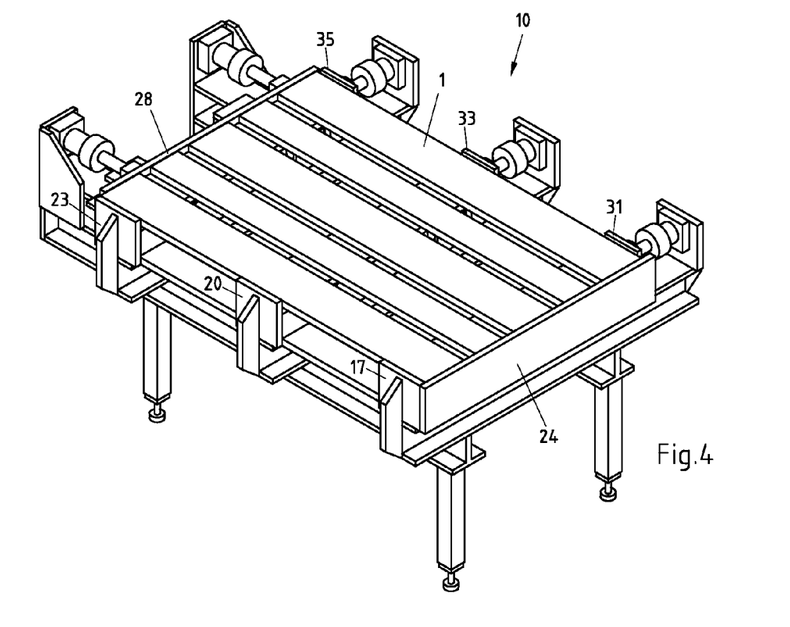
FIG. 4 shows a perspective view as in FIG. 3, but with a pallet received in the apparatus.

FIG. 4 shows the apparatus 10, together with a pallet 1 received therein, in its operational state. The expression "operational state" shall mean that the pallet 1 is clamped in the apparatus 10 due to the fact that all movable stop members have been brought into their operating positions by means of actuating their hydraulic cylinders. As can be seen in FIG. 4, the pallet 1 is aligned and retained along its circumference by means of the three movable lateral stop members 31, 33, 35, pressing the pallet 1 in transverse direction against the three fixed lateral stop members 17, 20, 23, and by means of the movable longitudinal stop member 28, pressing the pallet in longitudinal direction against the fixed longitudinal stop member 24. Thereby, it is ensured that the exterior dimensions of the pallet 1 are within fixed, predetermined nominal dimension values. For monitoring the real exterior dimensions of the pallet, if appropriate, additional sensor means may be provided. The pallet being retained and clamped, respectively, as shown in FIG. 4, it is understood that also the remaining movable lateral stop members, not visible in the illustration of FIG. 4, are actuated. Moreover, by the cooperation of the movable and the fixed lateral stop members, it is ensured that both the bottom deck board members and the connecting block members are positionally aligned and clamped at least in a direction running perpendicular to the longitudinal axis of the pallet. Once the pallet is in the clamped state as shown in FIG. 4, the individual pallet elements can be attached in their predetermined correct position by applying new connectors.

Thus, with the help of the apparatus of the invention and by applying new connectors, the result can be achieved that the exterior dimension of the pallet are within a predetermined nominal value, and that all bottom deck board members as well as all connecting block members are aligned parallel to each other and are positionally correctly located at least with regard to a line running perpendicular to the longitudinal axis of the pallet.

Preferably, damaged bottom deck board members are not replaced individually, but always in the form of skid elements, resulting in the advantage that the new connector elements can be applied from the top side of the pallet.

Figure 5:
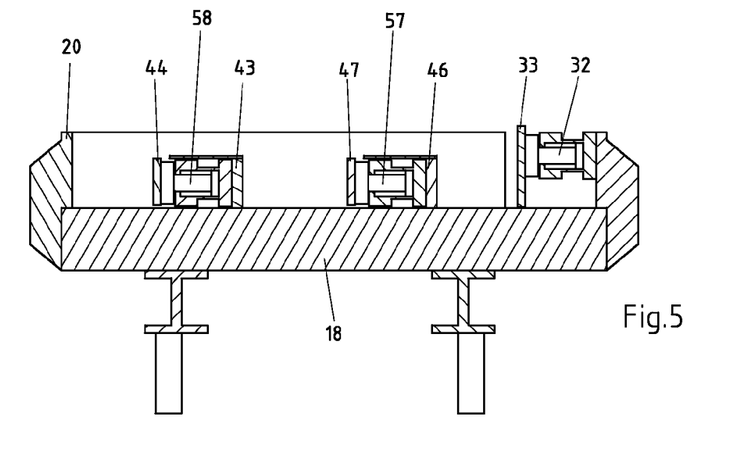
FIG. 5 shows a cross sectional view of the apparatus according to FIG. 3.

FIG. 5 shows a cross sectional view of the apparatus of FIG. 3, taken along the extension of the central transverse support member 18. Thereby, FIG. 5 clearly shows the arrangement of the three movable lateral stop members 33, 47, 44 with the assigned hydraulic cylinders 32, 57, 58 as well as the three fixed lateral stop members 46, 43, 20. The movable lateral stop members 33, 47, 44 and the fixed lateral stop members 46, 43, 20 are arranged in a row, such that, in each case, a movable lateral stop member cooperates with a fixed lateral stop member (33, 46; 47, 43; 44, 20) as a pair. In this view, the movable lateral stop members 33, 47, 44 are shown in the retracted rest position. If the movable lateral stop members 33, 47, 44 are in their rest positions, a pallet can be inserted into the apparatus. If, for example, a bottom deck board member or a skid is to be replaced, first, a new bottom deck board member and a new skid, respectively, is inserted into the apparatus at the proper position, and thereafter the partially disassembled pallet.

Further evident from FIG. 5 is that the inner lateral stop members 46, 47, 43, 44 have a lower height than the outer lateral stop members 33, 20. In the present example, the inner lateral stop members 46, 47, 43, 44 have a height that is less than the height of the outer lateral stop members 33, 20 by an amount corresponding to the thickness of a top deck board member plus the thickness of a stringer board member of the pallet. It can be further seen that the back of a particular hydraulic cylinder 57, 58 rests against a fixed lateral stop member 46, 43.

Figure 6:
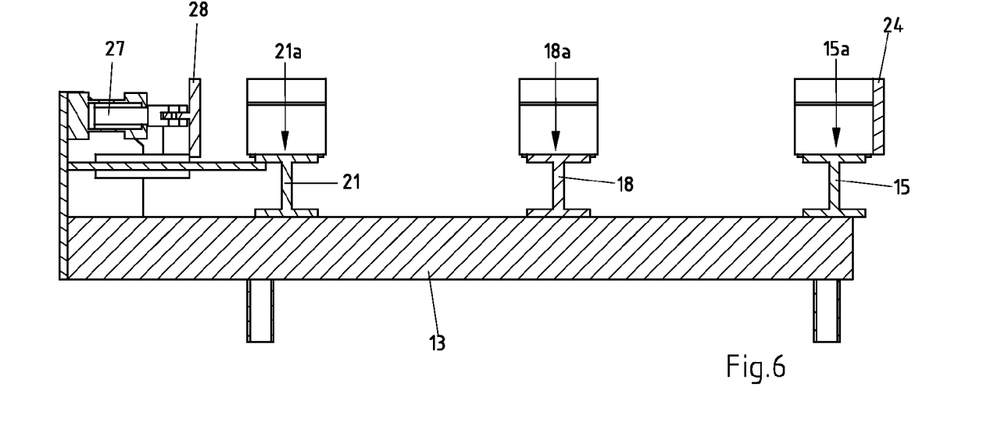
FIG. 6 shows a longitudinal sectional view of the apparatus according to FIG. 3.

FIG. 6 shows a longitudinal sectional view of the apparatus of FIG. 3, taken along the extension of the rear longitudinal support member 13. In this view, it can be seen that the top sides 15a, 18a, 21a of the transverse support members 15, 18, 21 constitute a rest surface on which a pallet can rest with its bottom deck board members. Moreover, the fixed longitudinal stop member 24 as well as the longitudinal stop member 28 movable by means of the two hydraulic cylinders 27, 28 (FIG. 3) is visible.

Figure 7:
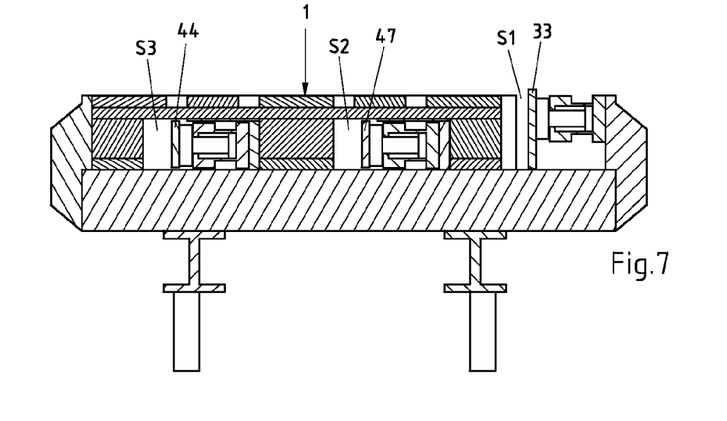
FIG. 7 shows a cross sectional view of the apparatus in its initial position, with a pallet received therein.

FIG. 7 shows the apparatus in a cross sectional view corresponding to FIG. 5, together with a pallet 1 received therein. Since the movable lateral stop members 33, 47, 44 are in their retracted position, i.e. in the rest position, there is in each case a gap S1, S2, S3 between the particular lateral stop member 33, 47, 44 and the corresponding pallet element.

Figure 8:
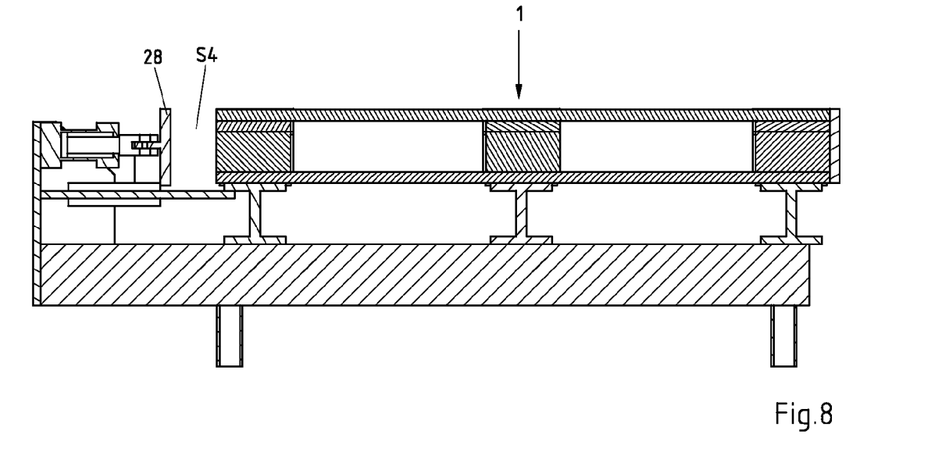
FIG. 8 shows a longitudinal sectional view of the apparatus in its initial position, with a pallet received therein.

FIG. 8 shows a cross sectional view of the apparatus, being in its initial or rest position, together with a pallet received in the apparatus. Between the front face of the pallet 1 and the lateral stop member 28, being in its retracted rest position, there is a gap S4 again.

Figure 9:
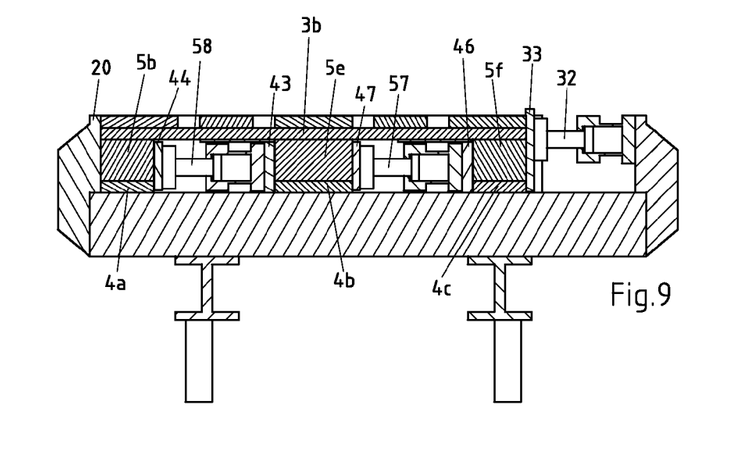
FIG. 9 shows a cross sectional view of the apparatus in its operating position, with a pallet received therein.

FIG. 9 shows a cross sectional view of the apparatus, being in its operational position, together with a pallet received therein. It can be clearly seen in this illustration that the two interior movable lateral stop members 47, 44 press a bottom deck board member 4b, 4a as well as a connecting block member 5e, 5b against the assigned fixed lateral stop member 43, 20. The outer movable lateral stop member 33 presses the one bottom deck board member 4c as well as the assigned connecting block member 5f against the adjacent fixed lateral stop member 46 and the one stringer board member 3b against the outer fixed lateral stop member 20. Thereby, the three connecting block members 5b, 5e, 5f, together with the three bottom deck board members 4a, 4b, 4c, are fixed and positioned in a direction transverse to the longitudinal axis of the pallet.

Figure 10:
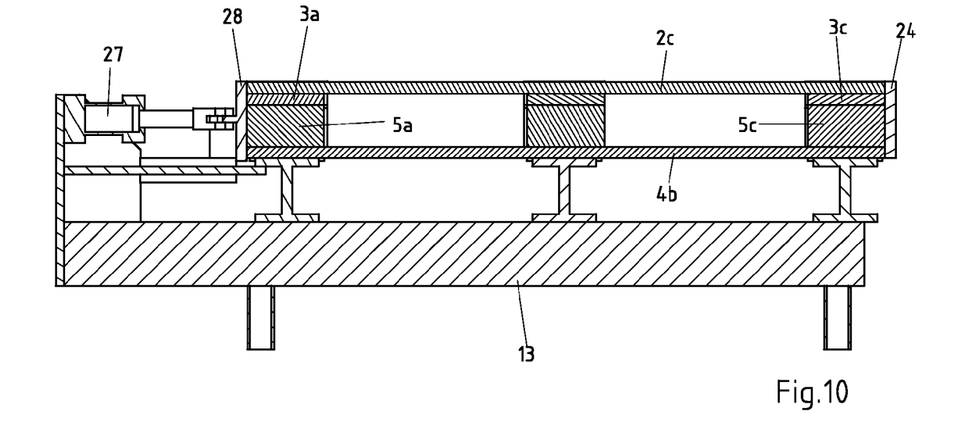
FIG. 10 shows a longitudinal sectional view of the apparatus in its operating position, with a pallet received therein.

FIG. 10 shows a longitudinal sectional view of the apparatus, being in its operational position, together with a pallet received therein. As can be seen from that illustration, the movable longitudinal stop member 28 presses both the particular bottom deck board member 4b as well as the particular top deck board member 2c against the fixed longitudinal stop member 24. Additionally, also the outer connecting block members 5a, 5c as well as the two outer stringer board members 3a, 3c are under load in such a way that they do not protrude to the outside.

To sum up, it should be noted that damaged pallet can be repaired easily and quickly with the help of the apparatus according to the invention, particularly because pallet elements or parts to be replaced can be retained in an exact position and aligned with regard to a partially disassembled pallet. Furthermore, it is ensured that the pallet elements responsible for an immaculate condition of the pallet, namely the bottom deck board members as well as the connecting block elements, are accurately positioned and retained by means of the apparatus, such that said pallet elements can be attached to a disassembled pallet in a predetermined alignment by applying new connector elements, particularly nails.

In a similar way, the apparatus of the invention is suitable for repairing loose and wobbly pallets, in which no parts or elements have to be replaced, but particular parts or elements have to be re-positioned and firmly attached in the correct orientation by applying new connectors. In any case, the movable stop members are matched to the fixed stop members in such a way that possibly displaced and/or misaligned pallet elements, particularly bottom deck board members and/or connecting block members, are correctly aligned, such that they are fixed in their predetermined position after new connectors have been applied.

Preferably, an attaching apparatus is assigned to the apparatus 10 of the invention, by means of which new connectors can be applied to the pallet to be repaired. Such an attaching apparatus can be constituted, for example, by a conventional, pneumatically driven and manually operated nail gun. However, it is also possible to provide a fully automatic nailing robot.

The invention claimed is:

1. An apparatus for at least one of aligning and retaining pallets or pallet elements to be repaired, whereby the pallets comprise a plurality of top deck board members defining a longitudinal axis of the pallet, a plurality of stringer board members and a plurality of bottom deck board members, whereby each bottom deck board member is attached to the stringer board members by means of a plurality of connecting block members disposed between the bottom deck board member and the stringer board members, and whereby the pallet elements are attached to each other by connector means, particularly by nails, characterized in that the apparatus comprises:

a base frame for supporting a pallet thereon;

at least one fixed lateral stop member fixedly mounted to said base frame, one of said at least one fixed lateral stop member including a 90° stop member offset 90° relative thereto to define a fixed reference point for receiving a pallet;

at least one movable lateral stop member for at least one of said plurality of deck board members, said at least one movable lateral stop member movably mounted to said base frame for lateral movement relative to said at least one fixed lateral stop member and perpendicular to the longitudinal axis of the pallet; and at least one movable longitudinal stop member, movably mounted to said base frame for movement parallel to the longitudinal axis of the pallet and offset 90° from the movement of the at least one movable lateral stop member and arranged for pressing the pallet in the longitudinal direction against said 90° stop member, whereby each of the movable lateral stop members is adapted to press an assigned deck board member or against a corresponding fixed lateral stop member in such a way that the assigned deck board member is positioned at least with regard to a line extending perpendicular to the longitudinal axis of the pallet and retained in this position; and wherein a fixed lateral stop member and a movable lateral stop member is provided for each connecting block member, whereby these stop members are configured to cooperate in pairs in such a way that they align both the connecting block members and the bottom deck board members at least with regard to a line running perpendicular to the longitudinal axis of the pallet and retain them in that position.

2. An apparatus according to claim 1, characterized in that a movable lateral stop member is assigned to each fixed lateral stop member.

3. An apparatus according to claim 1, characterized in that the stop member offset 90° and at least one movable longitudinal stop member are configured to align at least one of the top deck board members and the bottom deck board members with regard to the longitudinal axis of the pallet, and retain them in that position.

4. An apparatus according to claim 1 in which the pallets have three bottom deck board members and nine connecting block members, characterized in that the apparatus comprises nine fixed lateral stop members as well as nine movable lateral stop members, whereby the movable lateral stop members are adapted to press at least one of the particular bottom deck board member and the assigned connecting block members against a fixed stop member in such a way that said at least one of the particular bottom deck board member and the assigned connecting block members, is aligned with regard to a line running parallel to the longitudinal axis of the pallet and to retain them in that position.

5. An apparatus according to claim 1, characterized in that the apparatus comprises a rectangular recess for receiving the pallet, whereby one longitudinal wall of the recess includes at least one fixed lateral stop member, while the other longitudinal wall includes at least one movable lateral stop member.

6. An apparatus according to claim 5, characterized in that the front wall of said recess includes said stop member offset 90°, while the rear wall of said recess includes said at least one movable longitudinal stop member.

7. An apparatus according to claim 6, characterized in that, within said recess, additional fixed lateral stop members as well as additional movable lateral stop members are provided, said additional fixed and movable lateral stop members having a height that is less than the height of the outer stop members included in said walls delimiting said recess.

8. An apparatus according to claim 5, characterized in that, within said recess, additional fixed lateral stop members and additional movable lateral sto members are provided, said additional fixed and movable lateral stop members having a height that is less than the height of the stop members included in said walls delimiting said recess.

9. An apparatus according to claim 5, characterized in that one of the longitudinal walls of said recess is constituted by three fixed lateral stop members, while the other longitudinal wall of said recess is constituted by three movable lateral stop members, and that one of the front and rear faces of said recess is constituted by a fixed longitudinal sto member, while the other one of the front and rear faces of said recess is constituted by a movable longitudinal stop member.

10. An apparatus according to claim 5, characterized in that the front wall of said recess includes said at least one fixed longitudinal stop member, while the rear wall of said recess includes said at least one movable longitudinal stop member.

11. An apparatus according to claim 5, characterized in that one of the longitudinal walls of said recess is constituted by three fixed lateral stop members, while the other longitudinal wall of said recess is constituted by three movable lateral stop members, and that one of the front and rear faces of said recess is constituted by a fixed longitudinal sto member, while the other one of the front and rear faces of said recess is constituted by a movable 12. An apparatus according to claim 1, characterized in that the each movable stop member is provided with at least one hydraulically, pneumatically or electromechanically operated pressure cylinder, said cylinders being adapted to exert a pressure of at least 5 kN, preferably at least 15 kN, in a direction towards the assigned fixed stop member.

13. An apparatus according to claim 1, characterized in that the apparatus comprises at least one fixed lateral stop member and at least one movable lateral sto member for each of said plurality of bottom deck board members.

14. An apparatus according to claim 13, characterized in that the apparatus comprises at least two support members extending transverse to said longitudinal axis, each of said at support members supporting a fixed lateral stop member and a movable lateral stop member for each of said plurality of bottom deck board members.

15. An apparatus for at least one of aligning and retaining pallets or pallet elements to be repaired, whereby the pallets are formed by at least a plurality of top deck board members and a like plurality of bottom deck board members together defining and extending along a longitudinal axis of the pallet, and a plurality of stringer board members transverse to the longitudinal axis and extending across and attached to either of said top or bottom deck board members, whereby the bottom deck board member are attached to the top deck board members by means of a plurality of connecting block members, characterized in that the apparatus comprises:
  a base frame for supporting a pallet thereon;
  at least two fixed lateral stop members fixedly mounted to said base frame and arranged to contact a side of least one of said deck board members parallel to the longitudinal axis;
  a fixed longitudinal stop member fixedly mounted to said base frame and offset 90° relative to one of said fixed lateral stop members to define a fixed reference point for receiving the pallet, said fixed longitudinal stop member sized and arranged to contact an end of at least one of said deck board members along the longitudinal axis;
  at least one movable lateral stop member movably mounted to said base frame for movement relative to said at least two fixed lateral stop members perpendicular to the longitudinal axis, said at least one movable lateral stop member arranged on said base frame to contact a side of at least one of said deck board members parallel to the longitudinal axis when the pallet is received at said fixed reference point;
  at least one movable longitudinal stop member, movably mounted to said base frame for movement parallel to the longitudinal axis of the pallet and arranged for pressing at least one of said deck board members along the longitudinal axis against said fixed longitudinal stop member, and
  at least one inner movable lateral stop member disposed between said at least two fixed lateral stop members and said at least one movable lateral stop member, said inner movable lateral stop member movably mounted to said base frame for lateral movement relative to said at least two fixed lateral stop members perpendicular to the longitudinal axis, said inner movable lateral stop member having a height that is less than the height of said top deck board members above said base frame when the pallet is supported thereon so that said inner movable lateral stop member can move freely beneath said top deck board members.

16. The apparatus of claim 15, wherein said one of said fixed lateral stop members and said fixed longitudinal stop member have a height sufficient to contact both said top deck board members and said bottom deck board members.

17. The apparatus of claim 16, wherein said fixed longitudinal member has a length perpendicular to the longitudinal axis that is sufficient to simultaneously contact the end of all of said top deck board members and said bottom deck board members.

18. The apparatus of claim 16, further comprising only one movable longitudinal sto member, said one movable longitudinal stop member having a length perpendicular to the longitudinal axis that is sufficient to simultaneously contact the end of all of said top deck board members and said bottom deck board members.

19. The apparatus of claim 15, wherein all of said at least two fixed lateral stop members, said fixed longitudinal stop member, said at least one movable lateral stop member and said at least one movable longitudinal stop member have a height sufficient to contact both said top deck board members and said bottom deck board members.

20. The apparatus of claim 15, wherein said at least one inner movable lateral sto member includes an inner movable lateral stop member corresponding to and arranged to contact each one of the plurality of connecting block members.

21. The apparatus of claim 20, in which the pallet includes two outer top and bottom deck board members and at least one inner top and bottom deck board member disposed between the outer deck board members, and the pallet further includes at least two connecting block members for each pair of top and bottom deck board members including the inner deck board members, wherein said apparatus further comprises:
  at least four inner fixed lateral stop members corresponding to and arranged to contact a corresponding one of the connecting block members; and
  at least four inner movable lateral stop member, each opposing a corresponding one of said at least four inner fixed lateral sop members.

* * * * *